United States Patent
Ganthier et al.

[11] Patent Number: 6,137,677
[45] Date of Patent: *Oct. 24, 2000

[54] ERGONOMIC CONTROLS FOR A PERSONAL COMPUTER CPU

[75] Inventors: James J. Ganthier, Spring, Tex.; John H. Loudenslager, Phoenix, Ariz.; Celia M. Francis, Houston, Tex.; William R. Dorr, Phoenix, Ariz.

[73] Assignee: Compaq Computer Corporation, Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/876,058

[22] Filed: Jun. 13, 1997

[51] Int. Cl.⁷ .............................. G06F 1/16; A47B 81/00; H05K 7/14

[52] U.S. Cl. ................ 361/683; 361/685; 312/223.2; D14/107; D14/100; D14/102; 369/75.1; 369/75.2

[58] Field of Search ............................. 361/683, 680; 345/168, 172; 312/223.1, 223.2; D14/100, 102, 107; 369/75.1, 75.2

[56] References Cited

U.S. PATENT DOCUMENTS

| | | | |
|---|---|---|---|
| D. 363,466 | 10/1995 | Martin | D14/100 |
| D. 364,146 | 11/1995 | Esslinger | D14/100 |
| D. 383,444 | 9/1997 | Han | D14/100 |
| D. 406,823 | 3/1999 | Dorr et al. | D14/100 |
| 4,811,314 | 3/1989 | Alves | 369/75.1 |
| 5,265,083 | 11/1993 | Ishii et al. | 369/75.1 |
| 5,355,357 | 10/1994 | Yamamori et al. | 361/680 |
| 5,452,289 | 9/1995 | Sharma et al. | 370/32.1 |
| 5,481,645 | 1/1996 | Bertino et al. | 361/680 |
| 5,519,572 | 5/1996 | Luo | 361/683 |
| 5,583,742 | 12/1996 | Noda et al. | 361/683 |
| 5,621,612 | 4/1997 | Dahmen | 361/683 |
| 5,657,202 | 8/1997 | Ma | 361/683 |
| 5,683,156 | 11/1997 | Chen et al. | 361/683 |
| 5,701,231 | 12/1997 | Do et al. | 361/683 |
| 5,794,058 | 8/1998 | Resnick | 395/750.05 |

*Primary Examiner*—Leo P. Picard
*Assistant Examiner*—Lisa Lea-Edmonds
*Attorney, Agent, or Firm*—Conley, Rose & Tayon, P.C.; Michael F. Heim; Jonathan M. Harris

[57] ABSTRACT

A computer having a control panel for directly controlling software and hardware of the computer, eliminating the necessity of navigating software to control such functions. These direct controls can include audio CD controls, telephone answering machine controls, instructional software controls, power setting controls, and volume controls.

11 Claims, 5 Drawing Sheets

ERGONOMIC CONTROLS FOR A PERSONAL COMPUTER CPU

RELATED APPLICATIONS

BACKGROUND OF THE INVENTION

1. Field of the Invention

The present invention relates to the ergonomics of controls on a computer chassis. More particularly, the present invention relates to the ergonomic placement of controls on a personal computer chassis, and laptop computer chassis.

2. Description of the Related Art

Over the years computers have decreased in size and increased in speed. They have gone from the engineering lab and into the office place. They have further proceeded from the office place and into the home. Computers are being used every day for some of the most complex computing tasks such as missile launch control as well as some of the most simple tasks such as getting a recipe for apple pie from cooking software.

Presently, personal computers for use in the home are box-like and lack the design and ergonomic controls that make them completely suitable for home use. In essence, the present personal computers are computers designed for office or business use and then were required to function in the home.

Many personal computers have software control interfaces for compact disk ("CD") controls, volume controls, or telephone answering machine controls. Software controls are generally in the form of programs which provide windows on the computer screen. The user can enter the window and launch a program (such as a telephone dialer, FAX, or answering machine) or adjust volume (bass, treble), contrast on the screen, power consumption of the computer, etc. Thus, if a user wants any functionality from these programs, he must launch the appropriate interface software.

A drawback of having to launch interface software occurs when a user is in the middle of other tasks on his personal computer. For example, suppose a user is in the middle of preparing a document or a complex spread sheet and wishes to adjust the volume of the speakers or control the CD player to play a different song or disk. The user must stop working, launch the interface necessary to control the volume or CD player, make the necessary adjustments (via a mouse or key stokes), then return to the document or spread sheet that he was working on. This can be a laborious task in some cases.

It would be advantageous to merge some of the controls of consumer electronics into the area of personal computer electronics in an ergonomic fashion in order to alleviate the laborious tasks of, for example, changing volume or controlling a CD player easier to the user.

SUMMARY OF THE INVENTION

An object of the present invention is to provide controls for various necessary functions in an ergonomic hard-wired control fashion so that it is not necessary for a personal computer user to launch interface software via software. Instead, either the software can be launched via "hard-wired" buttons on the CPU chassis or interface software is directly controlled via hard-wired buttons on the CPU chassis.

Another object of the present invention is to alleviate user frustration of having to navigate software to perform tasks that consumer electronics performs at the touch of a button.

Another object of the present invention is to provide an ergonomically designed control panel associated with a central processing unit (CPU) chassis. Such a control panel will be organized so that a user can easily discern what each control is for and how it is to be used.

Another object of the present invention is to provide compact disk playing controls on a CPU chassis.

Another object of the present invention is to provide telephone answering machine (TAM) and telephone dialing controls on a CPU chassis.

Another object of the present invention is to provide a control to place the CPU in a "sleep" or low power mode on a CPU chassis.

Another object of the present invention is to provide a "home base" or help interrupt control on a CPU chassis.

Another object of the present invention is to provide a convergence of computer products and consumer electronic products into a single device.

Another object of the present invention is to provide a computer product that is greatly needed by the home consumer of computer products.

BRIEF DESCRIPTION OF THE DRAWINGS

Other objects, features and characteristics of the present invention, as well as methods of operation and functions of the related elements of structure, and the combination of parts and economies of manufacture, will become more apparent upon consideration of the following description and the appended claims with reference to the accompanying drawings, all of which from a part of this specification, wherein like reference numerals designate corresponding parts in the various figures, and wherein:

DETAILED DESCRIPTION OF THE PREFERRED EXEMPLARY EMBODIMENTS OF THE PRESENT INVENTION

Figure 1:
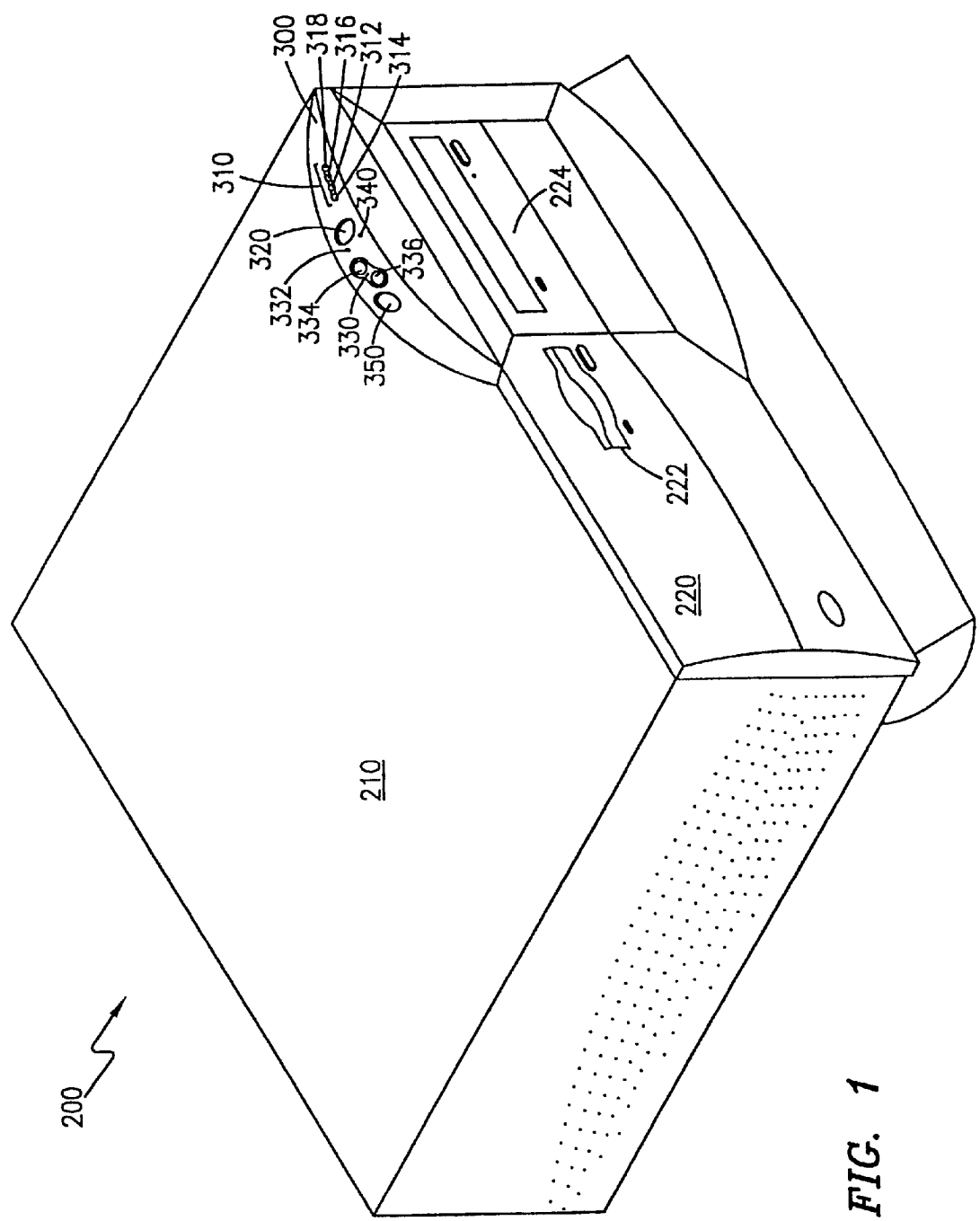
FIG. 1 is a perspective view of a first embodiment of the present invention.

Referring first to FIG. 1, there is shown a perspective view of a first embodiment of the present invention, a desktop CPU 200. This embodiment includes a chassis body 210 with an attached chassis face 220. The chassis face is comprised of several user interfaces such as floppy disk drive access and controls 222 and CD-ROM drive access and controls 224. Further included on the chassis face 220 is an ergonomic control panel 300. The ergonomic control panel 300 is preferably offset at an angle from the vertical plane of the chassis face 220 in order to facilitate ease of access and use.

Still referring to FIG. 1, the ergonomic control panel 300 includes audio compact disc (CD) controls 310. These controls 310 can be any means used to manipulate the play of an audio CD in the CD-ROM drive 224. In the present embodiment 200, these controls include a play/pause button 312, a stop button 314, a track advance button 316, and a track reverse button 318. Other controls found in a typical CD player could also be included, such as an eject button, a "fast-forward" button, a "rewind" button, and the like. The audio CD controls 310 are connected to the CD-ROM drive 224 by a means which allows the input signals to be sent directly to the CD-ROM drive control circuitry. It is further understood that control buttons for a tape drive or other storage media devices could be incorporated into the ergonomic control panel 300.

Referring still to FIG. 1, the ergonomic control panel 300 also includes a sleep function control means 320. In the present embodiment 200, this means is a button which may be depressed in order to begin or end operation of the computer at a low-power setting or "sleep" mode. This control means 320 preferably has an indicator means, such as an LED, liquid crystal, sound indicator, or mechanical device, which indicates to the user whether the computer is in the sleep mode. The ergonomic control panel 300 also incorporates a hard drive activity indicator, such as an LED 340 or other means, to indicate when the hard drive of the computer (not shown) is in operation.

Still referring to FIG. 1, the ergonomic control panel 300 further includes telephone answering machine (TAM) controls 330. The TAM controls 330 are utilized to control the telephone and telephone answering machine capacities available with the embodied computer 200 and can include means to perform any of the specialized functions of the aforementioned capacities. The telephone-oriented capacities that are controlled can be either hardware or software. In the present exemplary embodiment, the TAM controls 330 include a message button 334 that initiates software to retrieve telephone messages, and a speaker phone button 336 that initiates the operation of a speaker phone system comprised within the exemplary computer system. Also included is a message indicator LED 332 or other means to indicate when a message is available to be received. The message indicator could indicate other information related to the TAM, such as the number of phone messages or fax messages received and/or the time/date the messages were received.

Referring still to FIG. 1, the ergonomic control panel 300 further contains a help function control means 350, such as a button, that, when depressed, will initiate "help" or other instructional software which will aid the user with situation-specific instructions. The help function control means 350 creates a high level interrupt so that it will perform this function in most any circumstance the computer user is in.

The aforementioned control devices (CD controls 310, sleep function control means 320, TAM controls 330, and help function control means 350) also possess blue lining functionality. When a control device is activated by the user (i.e., audio CD play control), a message indicating such (i.e., "Play") will appear overlaid on top of the picture on the associated monitor (not shown).

While the aforementioned control devices have been frequently referred to as buttons, it will be appreciated by those skilled in the art that these control devices can take the form of any means that will inform the computer of user input, such as switches, knobs, touch-sensitive switches, voice/sound activated sensors and circuitry, and the like. In addition, the aforementioned control means can be placed at any position on the CPU 200, although they are preferably located together on the ergonomic control panel 300.

Figure 2:
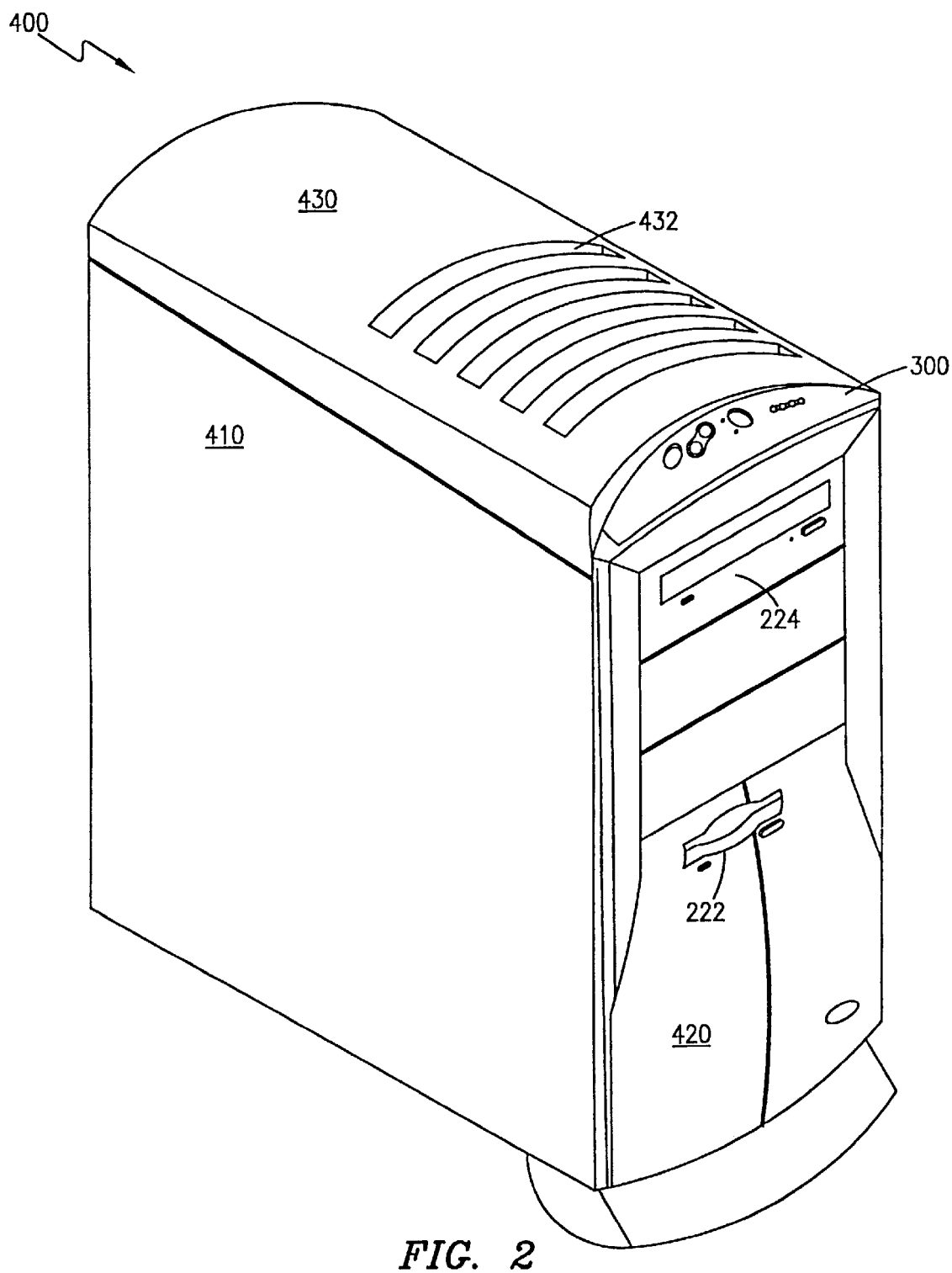
FIG. 2 is a perspective view of a second embodiment of the present invention.

Referring now to FIG. 2, there is shown a perspective view of a second embodiment of the present invention, a mini-tower CPU 400. The embodiment 400 contains the same features as the desktop computer embodiment 200, as shown in FIG. 1, although these features are configured for upright instead of horizontal placement. The chassis face 420, attached to the chassis body 410, likewise includes the ergonomic control panel 300 as described above. All control features remain substantially similar to those of the desktop computer embodiment 200.

Still referring to FIG. 2, the mini-tower CPU further includes a chassis top 430, attached to the chassis body 410. The chassis top 430 contains a plurality of CD jewel case slots 432 for the storage of audio CDs and CD-ROMs (not shown). The CD jewel case slots can be configured, as shown, substantially parallel to the ergonomic control panel, or may be configured perpendicularly or in a diagonal configuration. The CD jewel case slots enable a user to keep a select set of CDs or CD-ROM disks at a close hand for use in the CD-ROM player 224.

Figure 3:
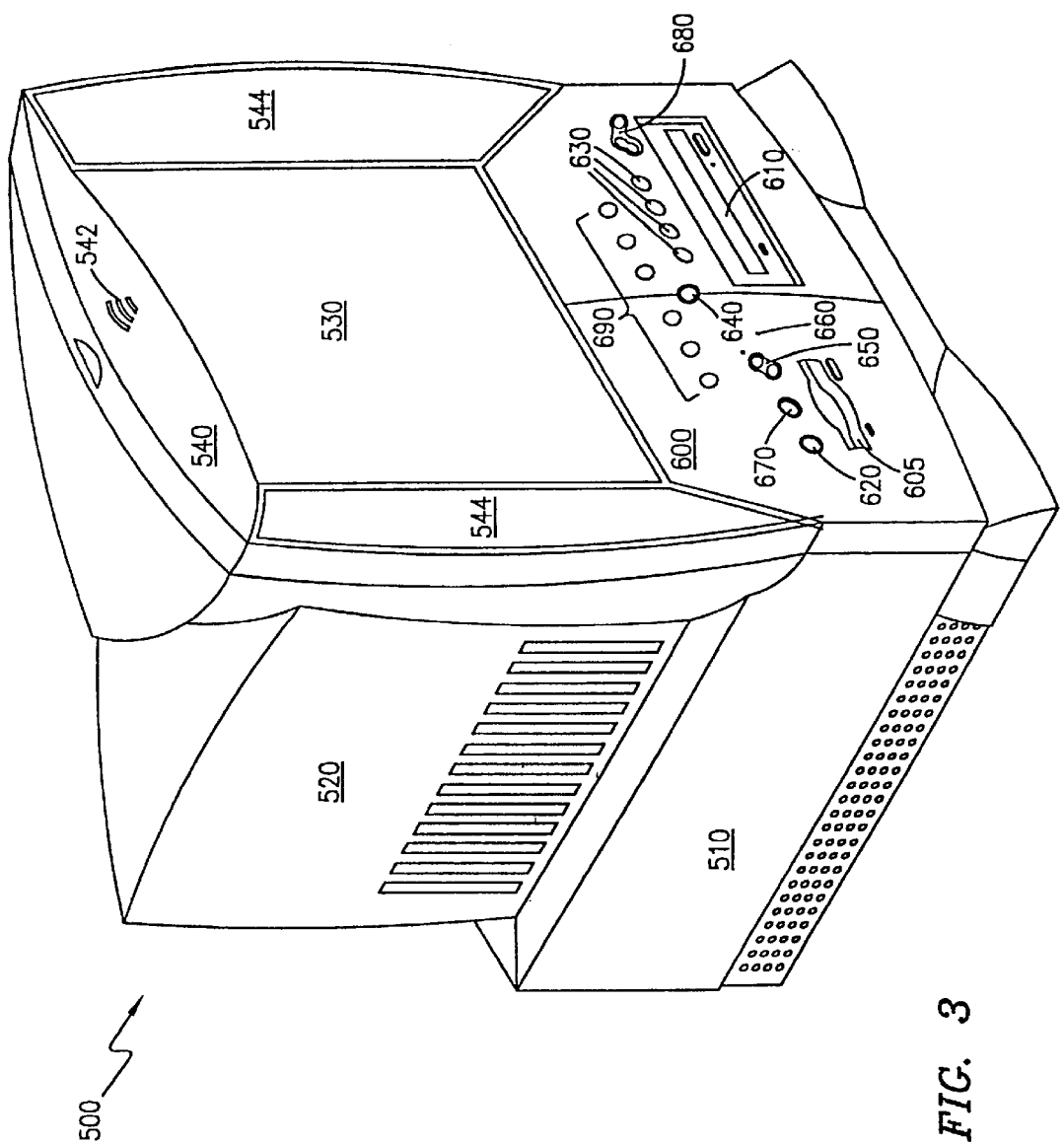
FIG. 3 is a perspective view of a third embodiment of the present invention.

Referring now to FIG. 3, there is shown a perspective view of a third embodiment of the present invention, a CPU/Monitor combination 500. The embodiment 500 is an amalgamation of a CPU portion 510 and a monitor portion 520. The relevant portion of this embodiment is the CPU/monitor face 530, which is the portion which faces the user. The face 530 is comprised of a monitor frame 540 and an ergonomic control panel 600. The monitor frame 540 surrounds the monitor 520 and includes a microphone 542 and a plurality of speakers 544. The ergonomic control panel 600 contains the floppy disk drive access and controls 605 and the CD-ROM drive access and controls 610, as well as an infrared window 620 for receiving input from a remote control device (not shown). In addition, the control panel 600 incorporates similar control devices as described in the aforementioned embodiments, including: the audio CD controls 630, the sleep function control means 640, the telephone answering machine (TAM) controls 650, the hard drive LED 660, and the help function control means 670.

Still referring to FIG. 3, the ergonomic control panel 600 in the present embodiment 500 also includes volume control means 680 to control the audio output of the speakers 544. The volume control means 680 include a volume increase button 682, a volume decrease button 684, and a volume mute button 686. Controls could also be added for other audio output manipulation, such as bass and treble level, balance control, and other such functions found on a typical stereo system. Also, although shown as buttons, these volume control means could also include knobs, switches, slides, or other consumer electronic control devices. The control panel 600 is further comprised of a set of monitor controls 690 for manipulation of the video output of the monitor. The controls 690 are preferably "pop-out" knobs so that while not in use, they can be inserted into and flush with the control panel 600.

Figure 4:
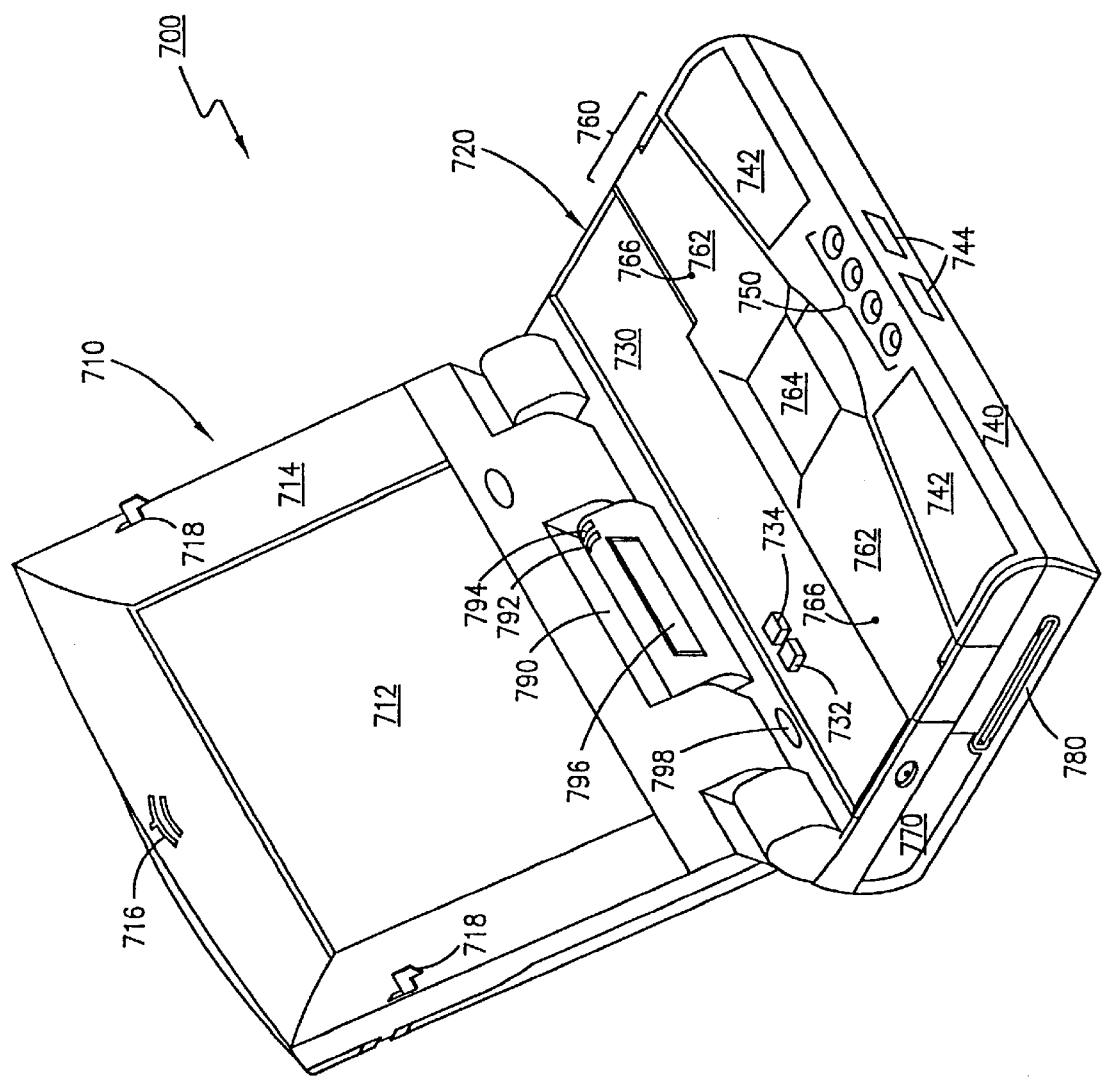
FIG. 4 is a perspective view of a fourth embodiment of the present invention.

Referring now to FIG. 4, there is shown a perspective view of a fourth embodiment of the present invention, a laptop computer 700. The laptop computer 700 is comprised of a screen component 710 hingedly connected to a CPU component 720. The screen component includes a viewing screen 712 and a screen frame 714 that surrounds the screen 712. A microphone 716 is installed in the screen frame 714 for audio input. Further included is a set of latches 718, used to lock the screen component in a closed position against the CPU component 720.

Still referring to FIG. 4, the CPU component 720 includes a keyboard 730, a forward edge 740, and a palm rest area 760 located between the forward edge 740 and the keyboard 730. The keyboard 730 contains a sleep function key 732 that controls the sleep function as described above, and a help function key 734 that controls the help function as described above. The forward edge 740 of the CPU component 720 extends outwardly toward the user so that when the screen component 710 is in a closed position against the CPU component 720, the forward edge 740 remains exposed to the user. The forward edge 740 preferably includes a plurality of speakers 742 with associated bass ports 744, as well as hardwired audio CD controls 750 as described above. The exposed design of the forward edge 740 allows the user to operate the audio CD function while the screen component 710 is in a closed position. The palm rest area is comprised of two palm rest panels 762 that are separated by a mouse control means 764. The palm rest panels 762 are designed to support the palms of the user's hand while typing, and they include a soft touch coating 766 for comfort. The forward edge 740 slopes downward from the palm rest area 760 to create an air space between the user's hands/wrists and the speakers 742.

Referring still to FIG. 4, the CPU component further includes a CD-ROM drive and controls 770 and a disk drive and controls 780. In addition, the CPU component incorporates several status indicators 790 near the interface of the CPU component 720 and the screen component 710. These indicators may include a power LED 792 that indicates when the computer is operating and a battery charge LED 794 that indicates when the battery is charging. Also incorporated is an LCD status window 796 that displays information such as when the caps lock or number lock is activated, the use of AC or battery power, and the amount of charge remaining in the battery. A power button 798, used to activate and deactivate the machine, is also located in the status indicators area 790.

Figure 5:
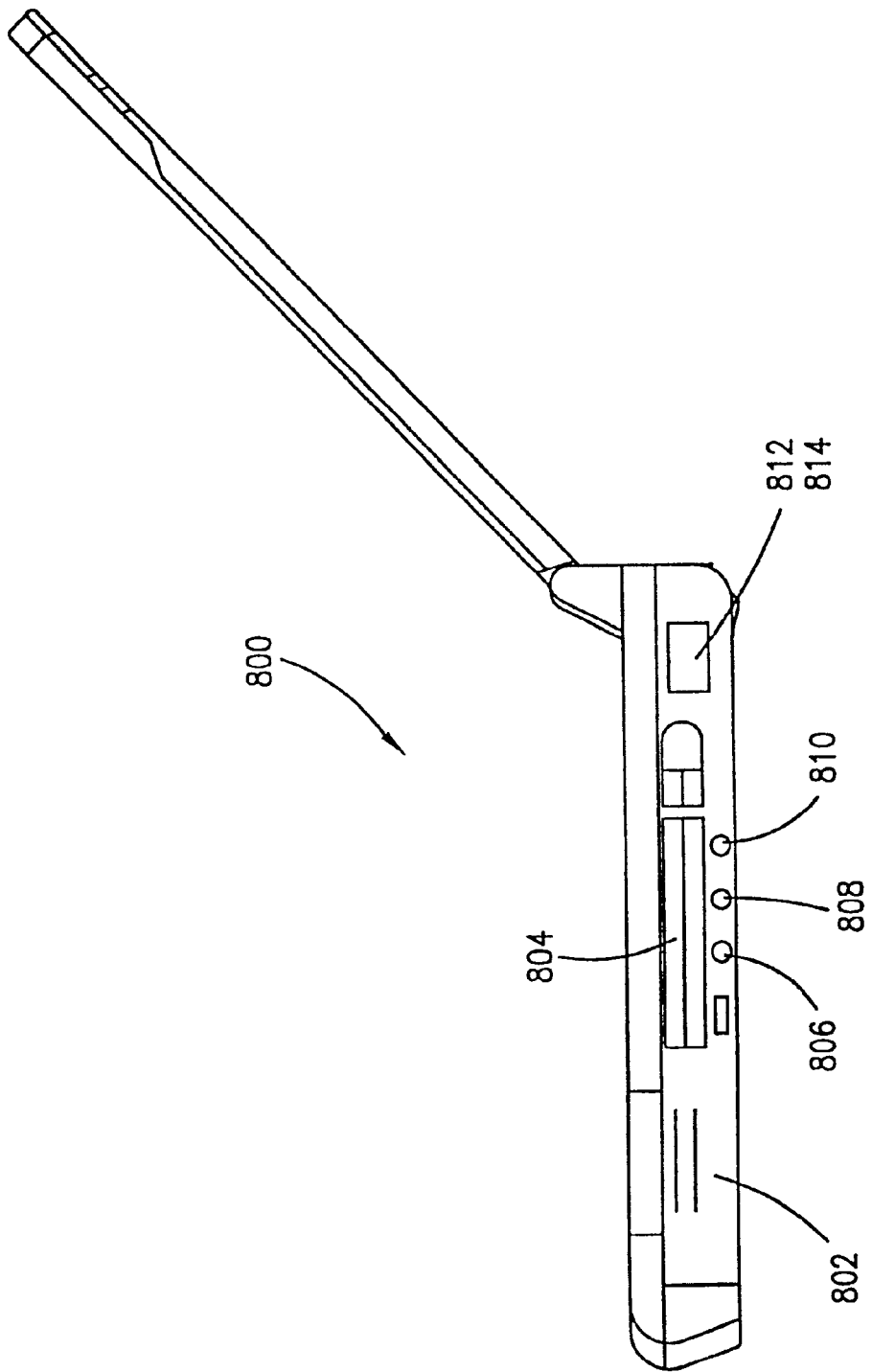
FIG. 5 is a side view of the fourth embodiment.

Referring now to FIG. 5, there is shown a side view of the laptop embodiment 700. The side portion 800 that is shown includes a battery door 802 for access to the battery (not shown) and card slots 804 for accommodating PCM-CIA cards (not shown). The side portion 800 also contains several jacks for connecting input and output devices, including: a headphone jack 806, a line out jack 808 for other audio output, a microphone jack 810 for audio input, a telephone line jack 812 for connecting to a telephone, and a modem jack 814 for connecting a telephone line.

Although a few preferred embodiments of the invention have been shown and described, it will be appreciated by those skilled in the art that changes may be made in these embodiments without departing from the principles and the spirit of the invention, the scope of which is defined in the appended claims.

What is claimed is:

1. A personal computer system comprising:

a CD-ROM drive;

a monitor device for displaying software program generated graphic information; and a central processing unit (CPU) chassis, said CPU chassis housing said CD-ROM drive, said CPU chassis being connected to said monitor device, said CPU chassis having an external control panel oriented so that the plane of its surface is inclined at an acute angle off the vertical plane of said CPU chassis, said control panel comprising:

a plurality of controls for controlling said personal computer system to emulate a compact disk audio player when a compact disk audio recording is in said CD-ROM drive, said personal computer being simultaneously operational by a user for navigating a displayed software graphic, said plurality of controls controlling the emulation of said compact disk audio player without the necessity of said user navigating said displayed software graphic via a keyboard or a pointing device.

2. A personal computer system comprising:

a CD-ROM drive;

a monitor device for displaying software program generated graphic information, and a central processing unit (CPU) chassis, said CPU chassis housing said CD-ROM drive, said CPU chassis being connected to said monitor device, said CPU chassis having an external control panel, said control panel comprising:

a plurality of controls for controlling said personal computer system to emulate a compact disk audio player when a compact disk audio recording is in said CD-ROM drive, said personal computer being simultaneously operational by a user for navigating a displayed software graphic, said plurality of controls controlling the emulation of said compact disk audio player without the necessity of said user navigating said displayed software graphic via a keyboard or a pointing device, wherein at least one of said plurality of controls is further for controlling said personal computer system to emulate aspects of a telephone answering machine system for receiving and recording telephonic messages.

3. The personal computer system of claim 2, wherein an emulated aspect of said telephone answering machine system includes retrieving and playing stored telephone messages.

4. The personal computer system of claim 2, further comprising a means for indicating that a telephone message has been received.

5. A personal computer system comprising:

a CD-ROM drive;

a monitor device for displaying software program generated graphic information; and a central processing unit (CPU) chassis, said CPU chassis housing said CD-ROM drive, said CPU chassis being connected to said monitor device, said CPU chassis having an external control panel, said control panel comprising:

a plurality of controls for controlling said personal computer system to emulate a compact disk audio player when a compact disk audio recording is in said CD-ROM drive, said personal computer being simultaneously operational by a user for navigating a displayed software graphic, said plurality of controls controlling the emulation of said compact disk audio player without the necessity of said user navigating said displayed software graphic via a keyboard or a pointing device, wherein at least one of said plurality of controls is for controlling said personal computer to emulate aspects of a speaker phone for telephonic communications.

6. A personal computer system comprising:

a CD-ROM drive;

a monitor device for displaying software program generated graphic information; and a central processing unit (CPU) chassis, said CPU chassis housing said CD-ROM drive, said CPU chassis being connected to said monitor device, said CPU chassis having an external control panel, said control panel comprising:

a plurality of controls for controlling said personal computer system to emulate a compact disk audio player when a compact disk audio recording is in said CD-ROM drive, said personal computer being simultaneously operational by a user for navigating a displayed software graphic, said plurality of controls controlling the emulation of said compact disk audio player without the necessity of said user navigating said displayed software graphic via a keyboard or a pointing device, wherein at least one of said plurality of controls is for activating instructional software to assist the user of said personal computer system.

7. A computer system comprising:

a central processing unit (CPU) chassis;

a display device connected to said CPU chassis for displaying software generated graphics;

a plurality of controls on the exterior of said chassis in a control panel, said plurality of controls being for controlling at least one of a CD audio player software and a telephone answering system software stored in the CPU chassis of said computer system; and a processor operable both to execute an application instruction in response to actuation of one of the plurality of controls without the necessity of navigating software and to execute the application instruction in response to user navigation of a graphical interface, wherein said control panel is oriented so that the plane of its surface is inclined at an acute angle off the vertical plane of said CPU chassis.

8. A computer system comprising:

a central processing unit (CPU) chassis;

a display device connected to said CPU chassis for displaying software generated graphics; a plurality of controls on the exterior of said chassis, said plurality of controls being for controlling at least one of a CD audio player software and a telephone answering system software stored in the CPU chassis of said computer system, a processor operable both to execute an application instruction in response to actuation of one of the plurality of controls without the necessity of navigating software and to execute the application instruction in response to user navigation of a graphical interface, wherein said computer system includes a low-power mode, and wherein at least one of said plurality of controls is for activating and deactivating said low-power mode.

9. A computer system comprising:

a central processing unit (CPU) chassis;

a display device connected to said CPU chassis for displaying software generated graphics;

a plurality of controls on the exterior of said chassis, said plurality of controls being for controlling at least one of a CD audio player software and a telephone answering machine system software stored in the CPU chassis of said computer system, wherein said telephone answering machine system software is adapted to enable said computer system to receive and record telephonic messages; and a processor operable both to execute an application instruction in response to actuation of one of the plurality of controls without the necessity of navigating software and to execute the application instruction in response to user navigation of a graphical interface.

10. The computer system of claim 9, further comprising a means for indicating when a telephone message has been received.

11. A computer system comprising:

a central processing unit (CPU) chassis;

a display device connected to said CPU chassis for displaying software generated graphics;

a plurality of controls on the exterior of said chassis, said plurality of controls being for controlling at least one of a CD audio player software and a telephone answering system software stored in the CPU chassis of said computer system, wherein at least one of said plurality of controls is for controlling instructional software to assist the user of said computer system; and a processor operable both to execute an application instruction in response to actuation of one of the plurality controls without the necessity of navigating software and to execute the application instruction in response to user navigation of a graphical interface.

* * * * *